(12) United States Patent
Junkins et al.

(10) Patent No.: US 6,556,351 B1
(45) Date of Patent: Apr. 29, 2003

(54) SYSTEM AND METHOD FOR ATTITUDE DETERMINATION BASED ON OPTICAL IMAGING

(75) Inventors: John L. Junkins, College Station, TX (US); Thomas C. Pollock, Caldwell, TX (US); Daniele Mortari, Colleferro (IT)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/975,290

(22) Filed: Oct. 10, 2001

Related U.S. Application Data

(60) Provisional application No. 60/239,559, filed on Oct. 10, 2000.

(51) Int. Cl.[7] .................. G02B 27/14; G01C 21/02; G01C 21/24; H01J 3/14; H01J 40/14
(52) U.S. Cl. .................. 359/636; 359/629; 359/634; 250/203.6; 250/216
(58) Field of Search .................. 359/629, 630, 359/634, 636, 637, 638, 640; 250/559.29, 559.38, 559.44, 559.46, 206.1, 206.2, 203.1, 203.7, 216

(56) References Cited

U.S. PATENT DOCUMENTS

| | | | | | |
|---|---|---|---|---|---|
| 3,614,449 A | * | 10/1971 | Ward, III | ..................... | 359/634 |
| 3,936,632 A | * | 2/1976 | Bradley et al. | .......... | 250/203.6 |
| 4,330,705 A | * | 5/1982 | Kollodge | ................. | 250/203.6 |
| 5,155,327 A | * | 10/1992 | Hoag | ..................... | 219/121.74 |

* cited by examiner

*Primary Examiner*—Georgia Epps
*Assistant Examiner*—Alicia M Harrington
(74) *Attorney, Agent, or Firm*—Baker Botts L.L.P.

(57) ABSTRACT

A method and apparatus is provide for receiving a first set of optical data from a first field of view and receiving a second set of optical data from a second field of view. A portion of the first set of optical data is communicated and a portion of the second set of optical data is reflected, both toward an optical combiner. The optical combiner then focuses the portions onto the image plane such that information at the image plane that is associated with the first and second fields of view is received by an optical detector and used to determine an attitude characteristic.

25 Claims, 4 Drawing Sheets

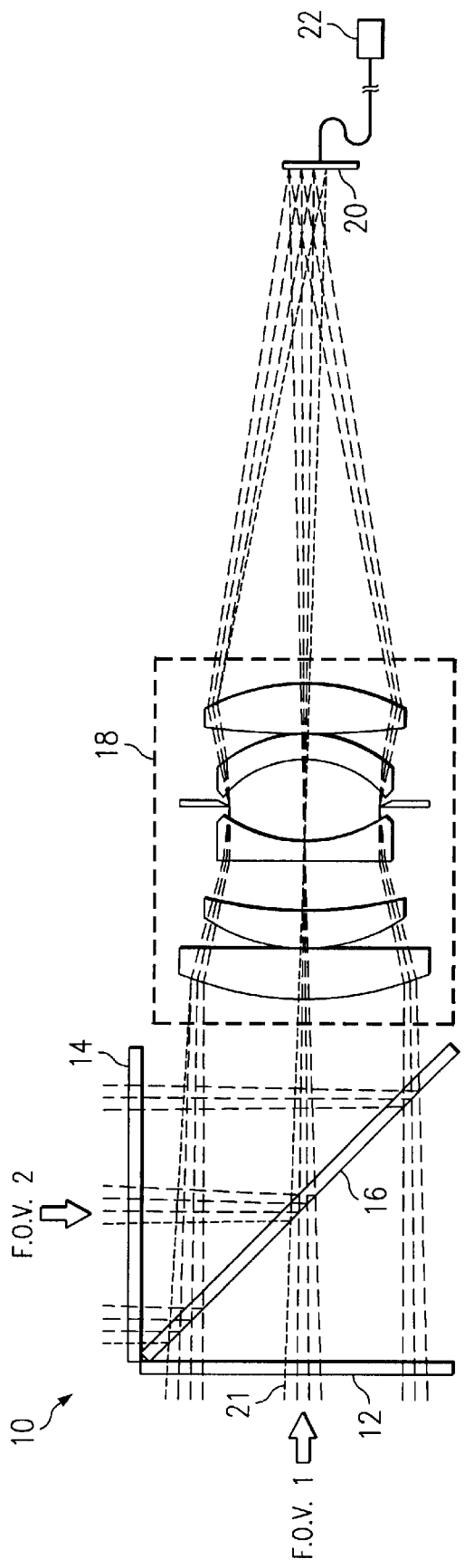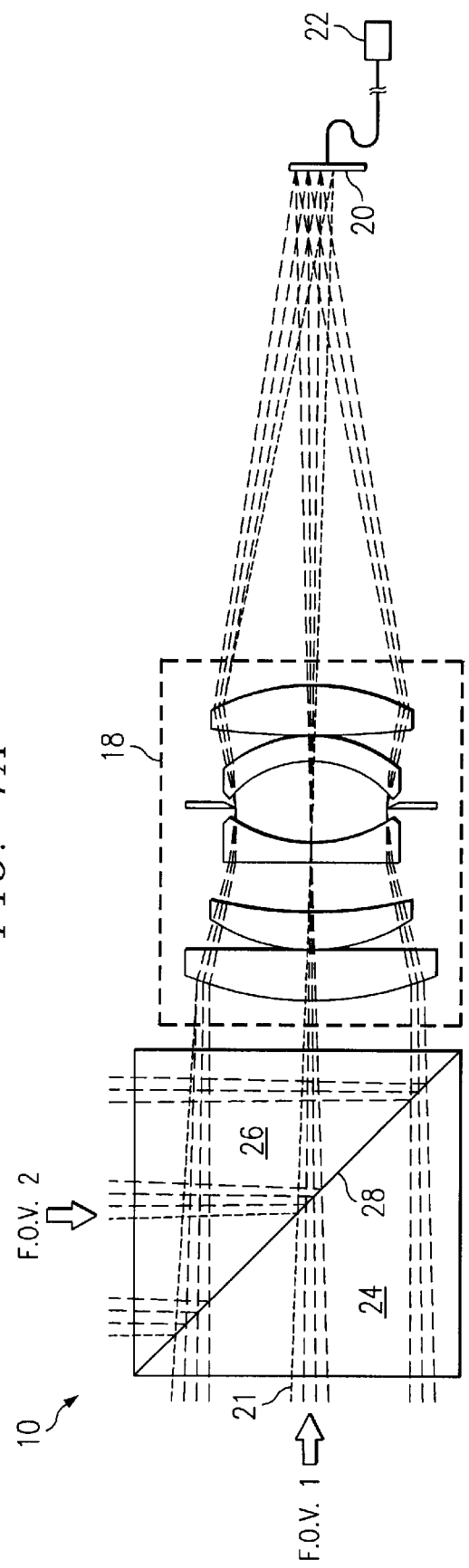

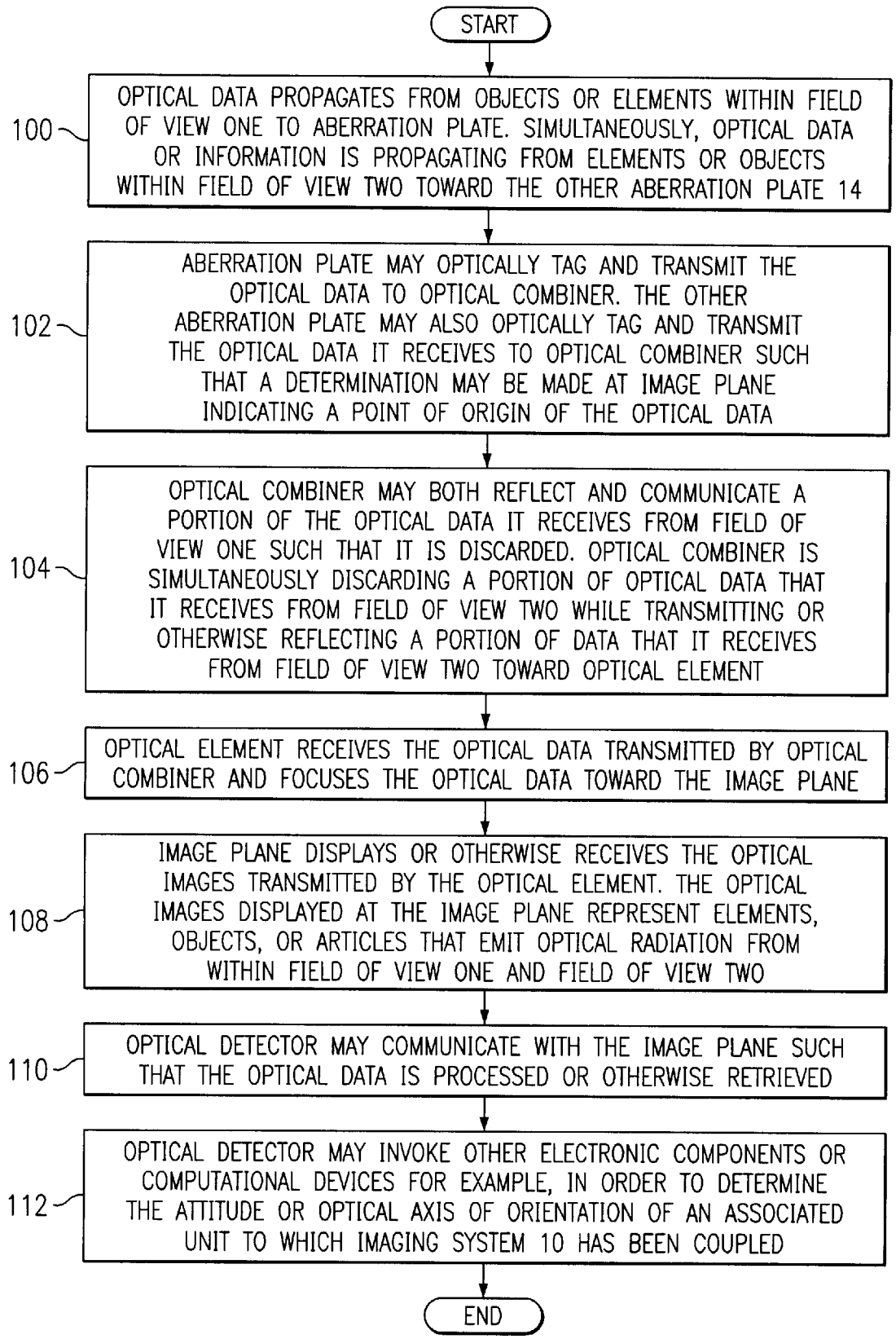

SYSTEM AND METHOD FOR ATTITUDE DETERMINATION BASED ON OPTICAL IMAGING

RELATED APPLICATION

This application claims the priority under 35 U.S.C. §119 of provisional application serial No. 60/239,559, entitled "Multiple Field-Of-View Imaging System and Method", filed Oct. 10, 2000.

GOVERNMENT RIGHTS

This invention was made with government support under NASA Grant Nos. NAG-1-1950 and NCC-1-386. Accordingly, the government has certain rights in this invention.

TECHNICAL FIELD OF THE INVENTION

This invention relates in general to the field of optical imaging, and more particularly to, a system and method for determining attitude based on optical imaging.

BACKGROUND OF THE INVENTION

Optical imaging has become increasingly important in today's society. One area associated with optical imaging relates to attitude determination or precision pointing. Attitude determination generally refers to measurements that relate to the optical orientation of an object based on optical data collected from a light emitting source proximate to the object. In some circumstances, optical cameras or imaging systems may be used to collect such optical data. These imaging systems generally may be attached to the object or the unit for which attitude determination is sought. Optical data collected by these imaging systems are invariably collected from a single field of view that captures the light energy from the light emitting source. While these imaging systems have been adequate for their intended purposes, they have not been satisfactory in all respects. Such imaging systems can be generally expensive, cumbersome, and often lacking in accuracy, for example.

SUMMARY OF THE INVENTION

According to one embodiment of the present invention an improved system and method for imaging optical data comprises receiving a first set of optical data from a first field of view and receiving a second set of optical data from a second field of view. A portion of the first set of optical data is communicated and a portion of the second set of optical data is reflected, both toward an optical element. The optical element focuses the portions onto the image plane such that information at the image plane that is associated with the first and second fields of view is communicated to an optical detector and used to determine an attitude characteristic.

Certain embodiments of the present invention provide a number of technical advantages; embodiments of the present invention, may enjoy some, all, or none of these advantages. For example, according to one embodiment of the present invention by collecting optical data from two fields of view, the imaging system of the present invention may achieve high precision pointing and optical orientation determination for an associated unit. This allows increased accuracy in attitude calculation by taking advantage of the ability to examine two fields of view simultaneously. Additionally, collection of optical data from two fields of view is achieved without the need for two separate imaging systems. The implementation of two optical cameras may be undesirable for at least reasons such as: expense, lack of flexibility, increased complexity, structural constraints or limitations, and poor accuracy, for example.

Other technical advantages of the present invention are readily apparent to one skilled in the art from the following figures, the description, and the claims.

BRIEF DESCRIPTION OF THE DRAWINGS

To provide a more complete understanding of the present invention and features and advantages thereof, reference is made to the following description taken in conjunction with the accompanying drawings, in which:

FIG. 1A is a diagrammatic side view of an imaging system in accordance with one embodiment of the present invention;

FIG. 1B is a diagrammatic side view of the imaging system of FIG. 1A that further includes the use of a set of optical prisms in accordance with one embodiment of the present invention;

FIG. 5 is a flowchart illustrating a series of steps associated with a method for imaging optical data using the imaging system of FIG. 1A in accordance with one embodiment of the present invention.

DETAILED DESCRIPTION OF EXAMPLE EMBODIMENTS OF THE PRESENT INVENTION

Figure 2:
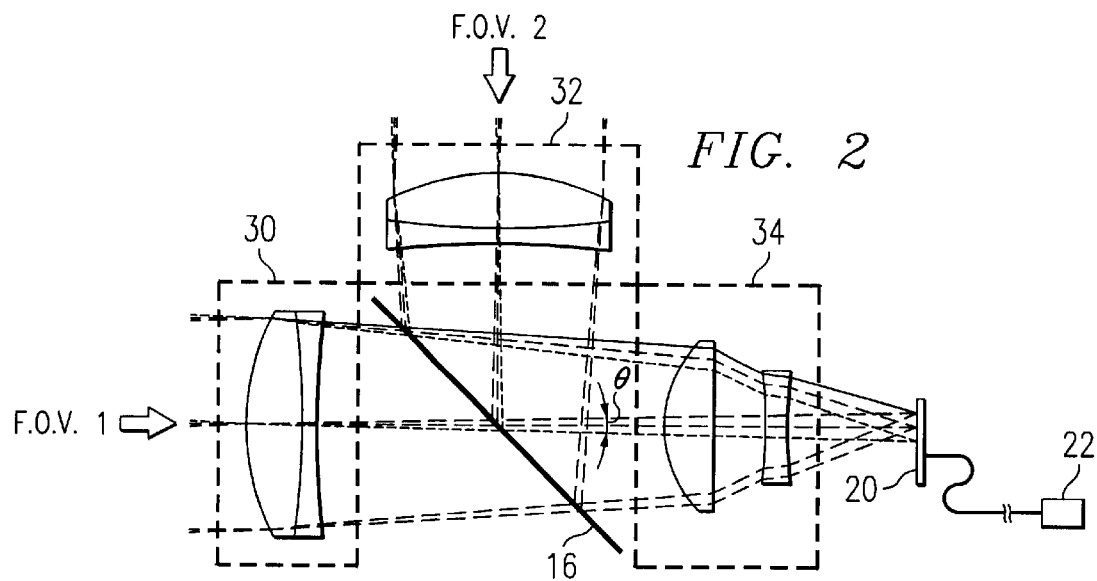
FIG. 2 is a diagrammatic side view of an alternative embodiment to the imaging system of FIG. 1A that illustrates the flexibility in positioning aberration plates in various locations in accordance with one embodiment of the present invention.

Example embodiments of the present invention are best understood by referring now to FIGS. 1A through 5 of the drawings in which like numerals refer to like parts.

FIG. 1A is a diagrammatic side view of an imaging system 10 in accordance with one embodiment of the present invention. Imaging system 10 comprises a first aberration plate 12 associated with one field of view and a second aberration plate 14 associated with a second field of view. Imaging system 10 additionally comprises an optical combiner 16, an optical element 18, an image plane 20 to which optical radiation may be directed, and an optical detector 22 that receives the optical radiation.

According to the teachings of the present invention, imaging system 10 represents a single functional apparatus simultaneously imaging two parts of an optical pattern that emits light energy. Imaging system 10 combines two fields of view from an optical pattern, whereby optical data may be collected from each field of view to serve as a basis for precision pointing or attitude determination at image plane 20. By collecting two sets of optical data from two separate fields of view, the present invention achieves highly accurate optical orientation measurements as well as attitude determination of an associated unit (described below), while using only a single optical element 18, a single optical combiner 16, and a single optical detector 22.

According to one embodiment of the present invention, imaging system 10 may be optically coupled to a unit to which attitude determination is sought. The unit may be any device, object, component, or element to which attitude determination is sought. Such units may include: a satellite (weather, GPS, navigational, etc.), a rocket, a plane, a missile, a vehicle, marine components or instruments, various aeronautical components, a robot, a ground surface or station or any number of earth mapping devices for example.

Field of view one and field of view two, as illustrated in FIG. 1 as F.O.V. 1 and F.O.V. 2 respectively, represent perspectives that sample optical energy or optical radiation from a given area. Such areas may include space, for example, where stars emanate or radiate optical energy that is collected by imaging system 10. In other environments, optical energy, to be collected by imaging system 10, may be produced by elements such as: street lights, sparkles from the water or waves in marine applications, infrared energy (passive or active), particularly applicable to the field of robotics (for example in a factory in the presence of structured light), or any other optical energy generating environment in which attitude, position, or optical orientation of an object is sought to be determined.

Aberration plates 12 and 14 are aberration elements that comprise cylindrical lenses according to one embodiment of the present invention. The cylindrical lenses may be used to optically tag optical data captured from respective fields of view. Optical tagging refers to any manipulation, modification, or alteration in the shape, intensity, distribution of light, or color in sets of optical data within field of view one or field of view two. This optical tagging allows for the identification of the origin of optical data from a particular field of view once it is received at image plane 20.

Use of cylindrical lenses for aberration plates 12 and 14 achieves the imaging of an elliptical portion of light on image plane 20 for each radiation emitting object or element within field of view one or field of view two, instead of a round portion of light energy. The shape of the ellipse could be determined by the curvature of the cylindrical lens selected. The cylindrical lens has an approximate index of refraction that is not the same as an index of refraction associated with a vacuum, in one embodiment. Aberration plates 12 and 14 may have any index of refraction and thus may comprise liquids, gases, or any other structure operable to communicate optical data from a given field of view. Additionally, although described as cylindrical lenses, the present invention contemplates that aberration plates 12 and 14 may include any surface, component, object, or element operable to tag, signify or otherwise communicate optical data received from a field of view (for purposes of teaching the present invention, a plethora of example aberration plates are provided below). Thus aberration plates 12 and 14 may be refractive or reflective, for example a mirror or a diffractive grating, that effects separation of light in one direction but not necessarily in the other.

According to the teachings of the present invention, aberration plates 12 and 14 may include numerous other optical components or elements that effect identification of optical data at image plane 20. Such elements may include: low order aberrators, diffractive elements, shaped apertures, holographic elements, and filters, for example. This optical tagging functionality is implemented to enhance the computational or imaging analysis of optical data at image plane 20. The disclosed potential elements or objects that may be used for aberration plates 12 and 14 are described in greater detail below.

Low order aberrators are one example of elements that may be used as aberration plates 12 and 14. Low order aberrators may reshape the optical data collected from field of view one or field of view two. This reshaping may be effected through the use of low order aberrator surfaces, which deviate from the optimal shape required to give an identical image of the optical element within the field of view being evaluated. The image of a point light source is not necessarily a point; rather, in a axis-symmetric system, a point of light is a round spot of finite diameter surrounded by concentric light and dark rings. The low order aberrator described herein may thus be used to alter or otherwise modify this image such that a field of view associated with its origin may be detected or otherwise identified.

Several other types of low order aberrators may also be used as aberration plates 12 and 14. One type of low order aberrator produces chromatic aberrations or colored based image errors, which are manifested in different colors focusing at different distances from an aperture. In other environments, chromatic aberrations are associated with different colors being magnified by an associated optical system to different sizes. Such chromatic aberrations may too be used to tag optical data or information received from field of view one or field of view two such that an origin associated with the sets of optical data may be determined at image plane 20.

Another type of low order aberrator that may be used as aberration plates 12 and 14 produces a monochromatic aberration, these aberrations are independent of wavelength. Monochromatic aberrations of interest may relate to functional concepts in the field of optical imaging such as: focusing, tilting, de-centering, field curvature, astigmatism, distortion, coma, and shape, for example. Some of these elements display the ability to remain reasonably uniform in shape, independent of the position within a given field of view.

Astigmatism is an example of yet another optical tool that may be used to tag optical data from field of view one or field of view two. Astigmatism is a type of monochromatic aberration that may be introduced by various methods, the simplest of which being the addition of a cylindrical lens or a cylindrical modification to the structure of a lens that may be included within or coupled to aberration plate 12 or aberration plate 14. Cylindrical lenses may thus be placed in the optical paths of both fields of view between the point source of optical radiation and an objective lens, the cylindrical lens having an appropriate focal length according to particular needs.

Decentering is yet another example of an optical tool that may be used to tag optical data from field of view one or field of view two. Decentering generally involves the use of a process in which an element of a lens is placed off-axis in order to produce an elongated spot at image plane 20. The element is decentered by a small fraction of the aperture, accompanied by a resulting spot pattern displayed at image plane 20.

Diffractive elements are yet another example of optical tools that may also be used as aberration plates 12 and 14. Diffractive elements comprise diffraction gratings, wires, or any other element or object comprising single or multiple lines operable to produce optical tags (potentially in the form of diffraction spikes). The diffraction spikes operate to project an image of an element in either field of view one or field of view two at image plane 20. Spikes may be produced in any field of view by placing such diffractive elements in the optical path of field of view one and field of view two. For each field of view, a unique line orientation may be chosen such that the diffractive spikes for each field of view are not parallel to those of any other field of view, thereby indicating or otherwise differentiating a field of view of origin.

Additionally, shaped apertures may be also used as aberration plates 12 and 14 in order to effect optical tagging of optical data from field of view one or field of view two. Defocusing an image produced by a point source that emits optical radiation causes an image to expand into a shape, which depends in part on the shape of the aperture in place. If, for example, aberration plate 12 or aberration plate 14 as illustrated in FIG. 1A is replaced with an opaque plate, which is pierced with a rectangular aperture, the defocused image will be approximately rectangular. This rectangular shape again could indicate or otherwise distinguish a field of view as a point of origin for the optical energy or data collected from field of view one or field of view two.

Another example of a shaped aperture that may effect optical tagging is a central obstruction element frequently implemented in Cassegrainian applications and in on-axis catadioptric lenses. These may be rounded in shape, generally large enough to produce a defocus spot, which may have a low intensity in the center. Again, this defocusing result may be used to identify an origin associated with optical data captured by imaging system 10.

Holographic elements may also be used as, or in conjunction with, aberration plates 12 and 14. The holographic element may be etched onto a reflective surface of either of aberration plates 12 and 14 for example, in order to effect tagging of optical data or information collected from a given field of view. As described above, the shape of the point source that emits optical radiation may be altered by placing an element, such as the holographic element, into an optical path of field of view one or field of view two. These optical elements generally achieve conversion of a single spot of light into a pattern of optical points or lines, whereby the pattern is determined by the construction of the holographic element.

Optical tagging of optical data or information collected from field of view one or field of view two may also be accomplished through the use of filters. The filters may be placed ahead of optical combiner 16 in order to tag the optical data so that it may later be identified as originating from field of view one or field of view two. The filter may be used in place of aberration plate 12 or aberration plate 14 or in conjunction with either. According to one embodiment of the present invention, a colored filter is used in order to tag the optical data or information. The present invention contemplates that imaging system 10 is also compatible with gray-sensors employed in the use of any other filtering technique or process operable to tag the optical data or information collected or otherwise captured by imaging system 10.

The present invention contemplates all such aberration concepts described above in the use of a single aberration plate, or multiple aberration plates being used within imaging system 10. These aberration concepts may be used in any combination with each other, or modified in any suitable manner according to particular needs. The aberration concepts offered above are provided for a thorough and complete teaching of the present invention and illustrate alternative ways in which the present invention contemplates tagging optical data received or otherwise collected by imaging system 10 within field of view one and field of view two. A myriad of other potential aberration plates 12 and 14 are also contemplated by the present invention; essentially, any element or object that may be used to distinguish optical data may be used as aberration plates 12 and 14 and the present invention's teachings encompass all such elements and objects.

In the case where a single aberration plate is used, one set of optical data that is tagged is simply distinguished from another set of optical data, which is not tagged. According to one embodiment of the present invention, aberration plates 12 and 14 may be eliminated entirely. When aberration plates 12 and 14 are eliminated, both fields of view are projected as round spots on image plane 20. This would then generally involve some mathematical computation, accompanied with the potential use of an algorithm in order to determine the origin of optical data or information from either field of view one or field of view two.

Referring back to FIG. 1A, optical combiner 16 may be used to combine optical data from field of view one and field of view two. According to one embodiment of the present invention, optical combiner 16 is an optical prism that includes a partial coating comprised of silver (Ag), operating to both transmit and reflect a portion of optical energy from each of field of views one and two. Alternatively, optical combiner 16 may be any reflective or refractive element, with or without a coating, that is operable to combine optical data or information from multiple fields of view. Optical combiner 16 operates to transmit a portion of the optical energy or light photons emitted by objects or elements within field of view one and field of view two to optical element 18. Both portions of the optical data transmitted to optical element 18 propagate along substantially the same axis. As these portions are being directed to optical element 18, optical combiner 16 also operates to simultaneously reflect or otherwise discard a portion of the optical energy or data collected from field of view one and from field of view two according to the teachings of the present invention. Thus, optical data from field of view one is divided such that a portion of the optical data is discarded while a portion of the radiation is transmitted by optical combiner 16 to optical element 18. Similarly, optical data collected from field of view two is divided such that a portion of the optical data is discarded while a portion of the optical data from field of view two is reflected or otherwise communicated toward optical element 18.

Optical element 18 represents one or more optical components, either reflective or refractive, that operate to focus the optical data that it receives toward image plane 20. According to one embodiment of the present invention, optical element 18 comprises an objective lens that focuses optical data toward image plane 20. Optical element 18 focuses optical data that it receives from optical combiner 16, via both fields of view, such that image plane 20 displays optical data from both fields of view at a coincident point in time. Optical element 18 may or may not be coordinated or otherwise designed in conjunction with optical combiner 16 or alternatively with any one of aberration plates 12 and 14, i.e. fabricated or otherwise manufactured with reference to other component specifications within imaging system 10.

According to one embodiment of the present invention, the optical data communicated by optical combiner 16 and received by optical element 18 is brought to a dull focus in order to enhance identification of a center point associated with an image projected onto image plane 20. In providing a certain amount of defocus, an image received at image plane 20 may be digitized with greater ease, allowing for increased accuracy in precision pointing and attitude determination. Alternatively, optical element 18 may receive optical radiation from optical combiner 16 and bring that radiation to any level of focus such that an image of some kind is reflected at image plane 20, the image being associated with optical data captured by imaging system 10 from multiple fields of view.

Image plane 20 is a point of reference that is perpendicular to an axis 21 of imaging system 10 according to one embodiment of the present invention. The illustration of image plane 20 being normal to the axis of imaging system 10 is offered only for the purposes of example. Imaging plane 20 merely represents a point of reference and may be positioned anywhere, and at any angle, such that an image is projected thereon. Image plane 20 may be curved or flat where the image is to be formed. Two images from fields of view one and two may be superimposed at image plane 20 in accordance with one embodiment of the present invention. These images are based on optical data collected by imaging system 10 from fields of view one and two.

According to one embodiment of the present invention, image plane 20 is coupled to optical detector 22 that captures or otherwise receives optical data from image plane 20. Optical detector 22 may comprise a recording element, such as film for example, that captures an optical image stemming from the optical data collected from field of view one and field of view two. Alternatively, optical detector 22 may comprise any chemical process or semi-conductor element that operates to capture an image at image plane 20 associated with the optical data retrieved from field of view one and field of view two. Additionally, optical detector 22 may include or be coupled to any other electronic device, component, or object that operates to display, process, modify, manipulate, or otherwise receive or communicate the optical data from fields of view one and two.

According to the teachings of the present invention, optical detector 22 may also include both imaging and non-imaging elements and/or components such as: photomultiplier tubes, charge coupled device (CCD) arrays, charge injection devices (CID), photo diode arrays, active pixel CMOS arrays, any one of numerous memory devices, graphical user interfaces, microprocessors, or wireless devices, for example.

In operation, imaging system 10 collects and images optical data in order to determine attitude characteristics or optical axis orientation for a given unit or apparatus. According to one embodiment of the present invention, imaging system 10 may be placed or otherwise coupled to an object in which attitude determination is sought. Alternatively, imaging system 10 may be placed at any location, mobile or immobile, static or dynamic, on the earth's surface or in space, accompanying or otherwise supplementing any aeronautical instrument, device, or element as described above.

Optical data propagates from objects or elements within field of view one to aberration plate 12. Aberration plate 12 may optically tag and transmit the optical data to optical combiner 16 such that a determination may be made at image plane 20 as to where the optical data originated. Simultaneously, as data is being collected from field of view one, optical data or information is propagating from elements or objects within field of view two toward aberration plate 14. Aberration plate 14 may optically tag and transmit the optical data it receives to optical combiner 16 such that a determination may be made at image plane 20 indicating a point of origin of the optical data.

Optical combiner 16 may reflect a portion of the optical data it receives from field of view one such that it is discarded. Additionally, optical combiner 16 may communicate a portion of optical data that it receives from field of view one toward optical element 18. As this is being done, optical combiner 16 is simultaneously discarding a portion of optical data that it receives from field of view two while transmitting or otherwise reflecting a portion of data that it receives from field of view two toward optical element 18. Hence, portions of optical data from each field of view are being both communicated and discarded simultaneously.

Optical element 18 receives the optical data transmitted by optical combiner 16 and focuses the optical data toward image plane 20. According to one embodiment of the present invention, optical element 18 includes a series of optical elements that operate in conjunction with each other to bring the optical data that it receives to a dull focus at image plane 20. Image plane 20 (which serves as a point of reference only) displays or otherwise receives the optical images transmitted by optical element 18; the optical images displayed at image plane 20 represent elements, objects, or articles that emit optical radiation from within field of view one and field of view two. Using this information, optical detector 22 may communicate with image plane 20 such that the optical data is processed or otherwise retrieved. Optical detector 22 may then invoke other electronic components or computational devices for example, in order to determine the attitude or optical axis of orientation of an associated unit to which imaging system 10 has been coupled. Thus, according to the teachings of the present invention, high precision pointing based on information from two separate fields of view may be achieved resulting in highly accurate attitude determination measurements offered at image plane 20, or alternatively at optical detector 22.

Referring now to FIG. 1B, FIG. 1B is a diagrammatic side view of imaging system 10 that includes a modification relating to aberration plates 12 and 14 of FIG. 1A. In contrast to FIG. 1A, a set of optical prisms 24 and 26 are substituted for aberration plates 12 and 14, according to one embodiment of the present invention. Optical prisms 24 and 26 are triangular blocks of transparent material operable to tag optical data received from elements or objects within field of view one and field of view two respectively. Optical prisms 24 and 26 may be polished or patterned on any of their respective surfaces in order to effect this optical tagging functionality. In one embodiment of the present invention, optical prisms 24 and 26 are used in conjunction with aberration plates 12 and 14, where any element may be used to optically tag data. Additionally, as described above with reference to aberration plates 12 and 14, either one or both of optical prisms 24 and 26 may be eliminated in accordance with the teachings of the present invention. The need for a separate aberration plate is avoided when optical prisms 24 and 26 are polished or otherwise patterned on a selected one of an associated surface. A beam combiner 28 is illustrated as the junction between respective hypotenuses of optical prisms 24 and 26. Beam combiner 28 behaves in the same manner as optical combiner 16 in reflecting and transmitting optical data or information that propagates from field of view one and field of view two. Alternatively, beam combiner 28 may be a pellicle element operating to achieve this functionality in reflecting and transmitting optical data. In operation, the system of FIG. 1B behaves in the same manner as the system illustrated in FIG. 1A in imaging optical data collected from fields of view one and two.

Referring now to FIG. 2, FIG. 2 is a diagrammatic side view illustrating the flexibility of the present invention in that any one of a number of aberration surfaces may be positioned at several locations within imaging system 10. FIG. 2 additionally illustrates variations in perspective angles of field of view one and field of view two. FIG. 2 includes aberration elements 30 and 32 that operate similar to aberration plates 12 and 14 in tagging optical data received from field of view one and field of view two. Aberration elements 30 and 32 behave in the same manner as aberration plates 12 and 14, but further illustrate the point that any one of a number of surfaces that function to tag optical data may be used in accordance with the teachings of the present invention.

According to one embodiment of the present invention, aberration elements 30 and 32 are coordinated and designed in combination with an alternative optical element 34. Optical element 34 behaves in a similar manner to optical element 18 in focusing optical energy into image plane 20. Thus, aberration elements 30 and 32 may operate in conjunction with optical element 34 in order to optically tag and project optical data captured from within fields of view one and two on to image plane 20.

Additionally, FIG. 2 illustrates that the present invention contemplates great flexibility in the angle or perspective of fields of view one and two. Thus, a perspective angle may be modified such that it is not parallel to optical axis 21 of imaging system 10. An angle θ is provided in FIG. 2 in order to illustrate this point; θ being at an angle of 8° according to one embodiment of the present invention. The 8° breadth illustrated in FIG. 2 achieves a broad perspective for optical data collected within field of view one. Such an angle may be particularly beneficial where precise pointing is sought in a single direction. In such scenarios, one field of view simply stares at a given illumination pattern (generally encompassing a single point of light) simultaneously with the other field of view more broadly evaluating an illumination pattern encompassing several points of light. θ is offered only for purposes of teaching the present invention, any suitable variations in the perspective of field of view one and field of view two may be made without departing from the scope of the present invention. Moreover, 8° is offered only for purposes of example and should not be construed to limit angles or perspectives taken by field of view one and field of view two.

FIG. 2 also illustrates that optical element 18 may be broken down into various parts or components in which optical components within optical element 18 are provided exterior to or outboard optical combiner 16 in accordance with the teachings of the present invention. The present invention contemplates that any such substitutions or divisions of optical element 18 may be made, generally resulting in greater flexibility given to imaging system 10. When aberration elements 30 and 32 are placed external to optical combiner 16, greater image widths and breadths associated with each respective field of view may be achieved. When optical elements or lenses are placed outboard of optical combiner 16, greater flexibility in the angular fields of view are also achieved, potentially allowing reception or capturing of a greater amount of optical data or information. Similarly, the embodiments shown in FIGS. 3 and 4 enjoy these same benefits because of the placement of optical element 18 exterior to optical combiner 16, as described in greater detail below.

Figure 3:
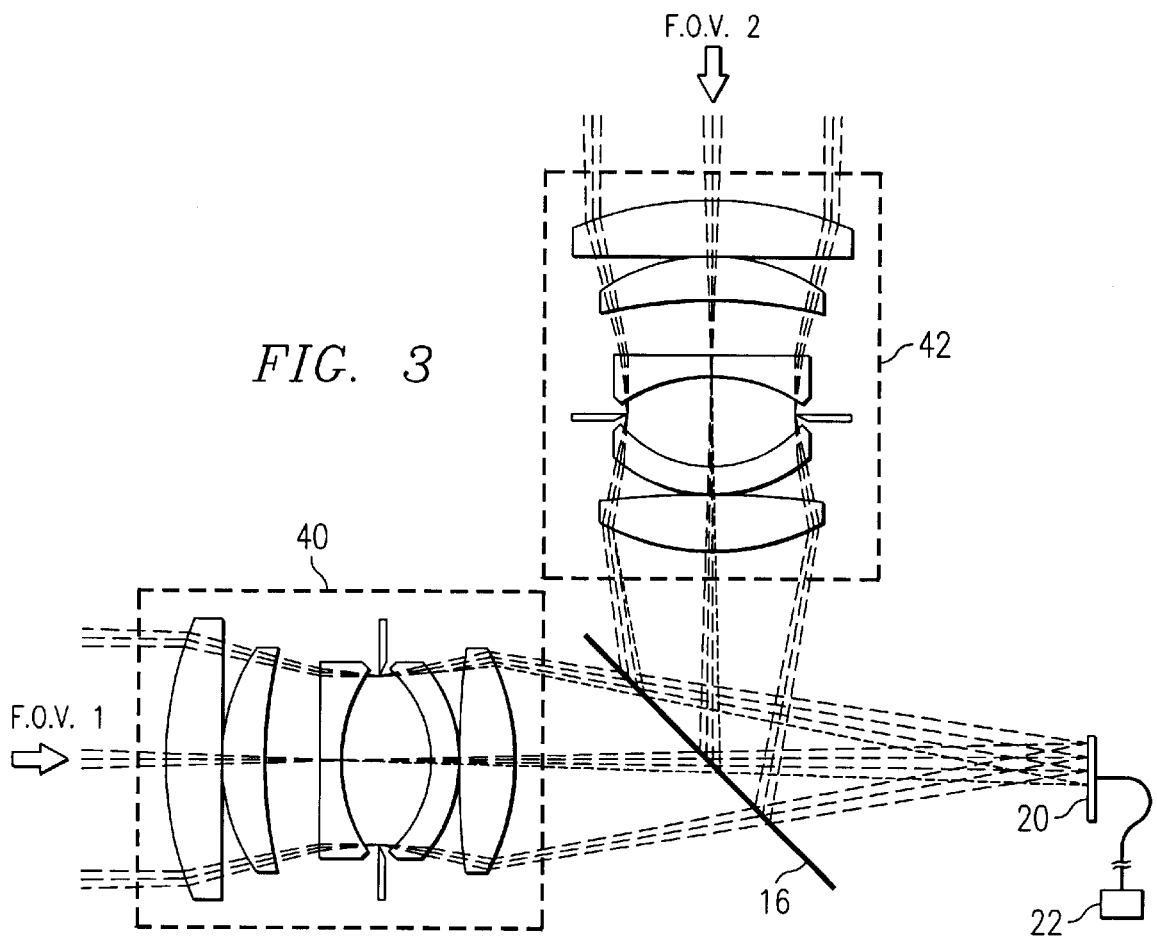
FIG. 3 is a diagrammatic side view of the imaging system of FIG. 1A illustrating a set of optical elements positioned in alternative locations in accordance with one embodiment of the present invention.

Referring now to FIG. 3, FIG. 3 is a diagrammatic side view illustrating an alternative embodiment of imaging system 10. FIG. 3 is similar to imaging system 10 disclosed in FIG. 1A with the addition of separate optical elements 40 and 42 provided for fields of view one and two. Optical elements 40 and 42 are similar to optical element 18 in that they may comprise any one of a number of optical components, elements, surfaces, lenses, or objects that operate to focus or otherwise communicate optical data or optical information from fields of view one and two; FIG. 3 merely illustrates two separate optical elements instead of one. FIG. 3 also again illustrates the great flexibility that accompanies the teachings of the present invention. Optical elements 40 and 42 are illustrated as being external to optical combiner 16. Each of optical elements 40 and 42 may include aberration surfaces or aberration elements as described above (with reference to optical element 18) such that optical data retrieved from respective fields of view may be optically tagged before being communicated to optical combiner 16. Additionally, optical elements 40 and 42 may be designed or fabricated in conjunction with the manufacture of optical combiner 16 such that a suitable image is projected onto image plane 20. Also optical elements 40 and 42 may operate to manipulate, process or otherwise influence the optical data received from fields of view one and two such that the image data is brought to a dull focus at image plane 20. As described above with reference to FIG. 1A, image plane 20 may be coupled to an optical detector 22, for example, such that additional optical imaging or processing may be facilitated.

Figure 4:
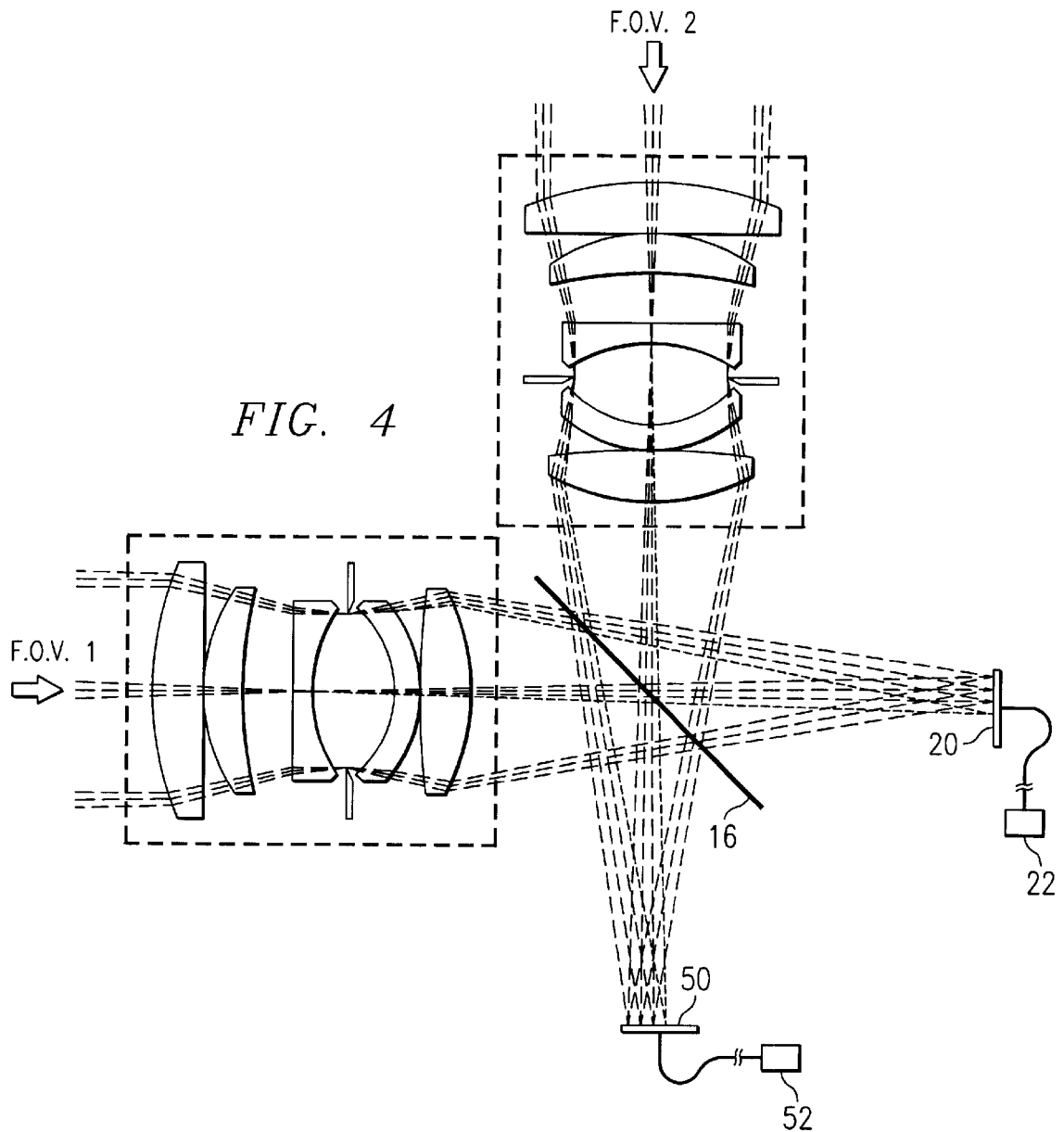
FIG. 4 is a diagrammatic side view of the imaging system of FIG. 3 illustrating the inclusion of multiple image planes in accordance with one embodiment of the present invention.

FIG. 4 is a diagrammatic side view illustrating yet another embodiment of imaging system 10 of FIG. 1A. FIG. 4 is very similar to FIG. 3 with the exception that an additional image plane 50 is provided. Optical data or information collected from fields of view one and two are not discarded as with the other disclosed embodiments in FIGS. 1A through 3. Optical combiner 16 again reflects and communicates a portion of optical data. As illustrated in the embodiment of FIG. 4, the would-be discarded optical data (illustrated in FIGS. 1A–3) is instead projected onto an associated image plane, either image plane 20 or image plane 50. Thus, according to the teachings of the present invention, FIG. 4 offers the advantages of fail over and redundancy for imaging system 10. Similar to the embodiment disclosed in FIG. 1A, image plane 50, like image plane 20, may be coupled to a corresponding optical detector 52, similar to optical detector 22. Optical detector 52 behaves in a manner similar to optical detector 22 in processing or otherwise facilitating the determination of an attitude measurement of an associated unit based on optical data collected from fields of view one and two.

FIG. 5 is a flowchart illustrating a series of steps associated with a method for imaging optical data using imaging system 10 of FIG. 1A, or other suitable components in accordance with one embodiment of the present invention. Imaging system 10 collects and images optical data in order to measure attitude determination or optical axis orientation for a given unit or apparatus.

The method begins at step 100 where optical data propagates from objects or elements within field of view one to aberration plate 12. Simultaneously, as data is being collected from field of view one, optical data or information is propagating from elements or objects within field of view two toward aberration plate 14. At step 102, aberration plate 12 may optically tag and transmit the optical data to optical combiner 16 such that a determination may be made at image plane 20 as to where the optical data originated. Also at step 102, aberration plate 14 may optically tag and transmit the optical data it receives to optical combiner 16 such that a determination may be made at image plane 20 indicating a point of origin of the optical data.

At step 104, optical combiner 16 may reflect a portion of the optical data it receives from field of view one such that it is discarded. Additionally, optical combiner 16 may communicate a portion of optical data that it receives from field of view one toward optical element 18. As this is being done, optical combiner 16 is simultaneously discarding a portion of optical data that it receives from field of view two while transmitting or otherwise reflecting a portion of data that it receives from field of view two toward optical element 18.

At step 106, optical element 18 receives the optical data transmitted by optical combiner 16 and focuses the optical data toward image plane 20. According to one embodiment of the present invention, optical element 18 comprises a series of optical elements that operate in conjunction with each other to bring the optical data that it receives to a dull focus at image plane 20. At step 108, image plane 20 displays or otherwise receives the optical images transmitted by optical element 18; the optical images displayed at image plane 20 represent elements, objects, or articles that emit optical energy from within field of view one and field of view two.

Using this information, at step 110, optical detector 22 may communicate with image plane 20 such that the optical data is processed or otherwise retrieved. At step 112, optical detector 22 may then invoke other electronic components or computational devices for example, in order to determine the attitude or optical axis of orientation of an associated unit to which imaging system 10 has been coupled. Thus, according to the teachings of the present invention, high precision pointing based on information from two separate fields of view may be achieved, resulting in highly accurate attitude determination measurements offered at image plane 20, or alternatively at optical detector 22.

Although the present invention has been described in detail with reference to the particular embodiments illustrated in FIGS. 1A through 5, it should be understood that various other changes, substitutions, and alterations may be made hereto without departing from the spirit and scope of the present invention.

For example, although the present invention has been described as being coupled to an arbitrary unit such as a satellite for example, the present invention has many other applications such as with any optical camera, telescope, street lights, marine application (potentially where sparkles from the water may serve as an adequate source of optical data or information that form an optical pattern) devices or components, robotics (for example in a factory in the presence of structured light), infrared application devices or components, or any other optical or imaging system that seeks to determine the attitude, position, or optical orientation of an object based on captured or otherwise received optical data or information.

Additionally, although the present invention has been described with reference to two fields of view, multiple fields of view may be used in accordance with the teachings of the present invention. Moreover, multiple imaging systems may be used, where one or more imaging systems communicate with each other. Wireless applications involving any facet of attitude determination are also contemplated by the present invention. Numerous other changes, substitutions, variations, alterations, and modifications may be suggested to one skilled in the art and it is intended that the present invention encompass all such changes, substitutions, variations, alterations, and modifications as falling within the spirit and scope of the appended claims.

What is claimed is:

1. A method, comprising:
   receiving a first set of optical data from a first field of view;
   receiving a second set of optical data from a second field of view;
   passing a portion of the first set of optical data and reflecting a portion of the second set of optical data toward an optical element;
   receiving the portions of the sets of optical data at the optical element;
   focusing, by the optical element, the portions onto an image plane; and
   determining an attitude characteristic based on information received at the image plane that is associated with the portions.

2. The method of claim 1, further comprising:
   positioning, in an optical path associated with the first field of view, an aberrator element operable to communicate the first set of optical data toward an optical combiner; and
   providing, by the aberrator element, an optical tag for the first set of optical data that identifies an origin associated with the first set of optical data when the first set of optical data reaches the image plane.

3. The method of claim 2, further comprising:
   communicating with the image plane such that the first and second sets of optical data are imaged; and
   identifying the optical tag at the image plane such that the origin of the first set of optical data is determined.

4. The method of claim 3, further comprising reflecting a portion of each of the first and second sets of optical data with a reflective coating, wherein the optical combiner comprises the reflective coating.

5. The method of claim 1, further comprising separating light energy with the optical element in at least one direction, wherein each of the first and second sets of optical data comprise a portion of the light energy.

6. An apparatus associated with a unit, the apparatus comprising:
   an optical combiner operable to receive a first set of optical data from a first field of view and to receive a second set of optical data from a second field of view, the optical combiner being further operable to pass a portion of the first set of optical data and to reflect a portion of the second set of optical data toward an optical element;
   the optical element is operable to receive the portions and focus the portions onto an image plane; and
   an optical detector that receives information at the image plane that is associated with the portions such that a determination of an attitude characteristic of the unit is made that is based on the information.

7. The apparatus of claim 6, further comprising an aberrator element positioned in an optical path associated with the first field of view, the aberrator element operable to communicate the first set of optical data toward the optical combiner and to provide an optical tag for the first set of optical data that identifies an origin associated with the first set of optical data to be identified when the first set of optical data reaches the image plane.

8. The apparatus of claim 7, wherein the aberrator element is selected from the group consisting of:
   a) a low order aberrator
   b) an optically diffractive element
   c) a shaped aperture
   d) a holographic element; and
   e) a filter.

9. The apparatus of claim 7, further comprising an additional aberrator element positioned in an optical path associated with the second field of view, the additional aberrator element operable to communicate the second set of optical data toward the optical combiner and to provide an optical tag for the second set of optical data that identifies an origin associated with the second set of optical data when the second set of optical data reaches the image plane.

10. The apparatus of claim 9, wherein the optical detector communicates with the image plane such that the first and second sets of optical data are imaged by the optical detector, and wherein the optical detector is further operable to identify the optical tags such that the origins of the first and second sets of optical data are determined.

11. The apparatus of claim 9, wherein the aberrator elements are optical prisms.

12. The apparatus of claim 6, wherein the first and second sets of optical data comprise light energy, and wherein the optical element comprises a cylindrical lens operable to effect separation of the light energy in at least one direction.

13. The apparatus of claim 6, wherein the optical combiner includes a coating comprising silver, the coating being operable to reflect a portion of each of the first and second sets of optical data.

14. An apparatus associated with a unit, the apparatus comprising:
a first optical element operable to receive and to direct a first set of optical data from a first field of view;
a second optical element operable to receive and to direct a second set of optical data from a second field of view;
an optical combiner operable to receive the first and second sets of optical data from the optical elements, the optical combiner being further operable to pass a portion of the first set of optical data toward an image plane and to reflect a portion of the second set of optical data toward the image plane; and
an optical detector that receives information at the image plane that is associated with the portions such that a determination of an attitude characteristic of the unit is made that is based on the information.

15. The apparatus of claim 14, wherein the first and second optical elements are each operable to provide an optical tag for the first and second sets of optical data, the optical tags each identifying an origin associated with the first and second sets of optical data when the first and second sets of optical data reach the image plane.

16. The apparatus of claim 15, wherein the first and second optical elements each comprise an aberrator element operable to provide the optical tags, and wherein each of the aberrator elements are selected from the group consisting of:
a) a low order aberrator
b) an optically diffractive element
c) a shaped aperture
d) a holographic element; and
e) a filter.

17. The apparatus of claim 16, wherein the optical detector communicates with the image plane such that the first and second sets of optical data are imaged by the optical detector, and wherein the optical detector is operable to identify the optical tags such that the origins of the first and second sets of optical data are determined.

18. The apparatus of claim 14, wherein the first and second sets of optical data each comprise light energy, and wherein the first and second optical elements each comprise a cylindrical lens operable to effect separation of the light energy in at least one direction.

19. The apparatus of claim 14, wherein the optical combiner includes a coating comprising silver, the coating being operable to reflect a portion of each of the first and second sets of optical data toward the image plane.

20. The apparatus of claim 14, wherein the optical combiner is further operable to reflect a portion of the first set of optical data toward an additional image plane and to communicate a portion of the second set of optical data toward the additional image plane such that information at the additional image plane that is associated with the first and second fields of view may be used to determine an attitude characteristic of the unit.

21. A system, comprising:
means for receiving a first set of optical data from a first field of view;
means for receiving a second set of optical data from a second field of view;
means for communicating a portion of the first set of optical data and reflecting a portion of the second set of optical data toward an optical element;
means for receiving the portions of the sets of optical data at the optical element;
means for focusing the portions onto an image plane; and
means for determining an attitude characteristic based on information received at the image plane that is associated with the portions.

22. The system of claim 21, further comprising:
means for disposing, in an optical path associated with the first field of view, an aberrator element operable to communicate the first set of optical data toward an optical combiner; and
means for providing an optical tag for the first set of optical data that identifies an origin associated with the first set of optical data when the first set of optical data reaches the image plane.

23. The system of claim 21, further comprising:
means for communicating with the image plane such that the first and second sets of optical data are imaged; and
means for identifying the optical tag such that the origin of the first set of optical data is determined.

24. The system of claim 21, further comprising means for separating light energy in at least one direction, wherein the sets of optical data each comprises a portion of the light energy.

25. An apparatus associated with a unit, the apparatus comprising:
an optical combiner operable to receive a first set of optical data from a first field of view and to receive a second set of optical data from a second field of view, the optical combiner being further operable to pass a portion of the first set of optical data and to reflect a portion of the second set of optical data;
an optical element operable to receive the portions and focus the portions onto an image plane;
a first aberrator positioned in an optical path associated with the first field of view, the first aberrator operable to communicate the first set of optical data toward the optical combiner and to provide a first optical tag for the first set of optical data that identifies an origin associated with the first set of optical data when the first set of optical data reaches the image plane;
a second aberrator positioned in an optical path associated with the second field of view, the second aberrator operable to communicate the second set of optical data toward the optical combiner and to provide a second optical tag for the second set of optical data that identifies an origin associated with the second set of optical data when the second set of optical data reaches the image plane; and
an optical detector that communicates with the image plane such that information received at the image plane that is associated with the portions is used to determine an attitude characteristic of the unit, wherein the optical detector is further operable to identify the optical tags such that the origins of the first and second sets of optical data are determined.

* * * * *